C. H. HOPF.
COLLAPSIBLE LUGGAGE CARRIER.
APPLICATION FILED NOV. 22, 1920.
1,426,644.
Patented Aug. 22, 1922.
2 SHEETS—SHEET 1.
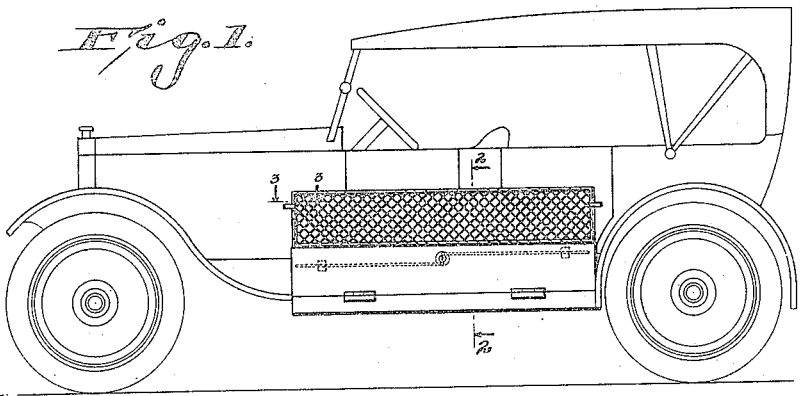
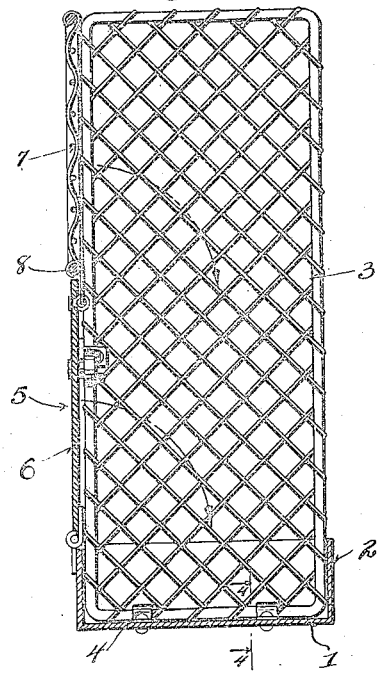
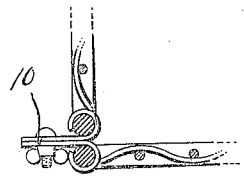
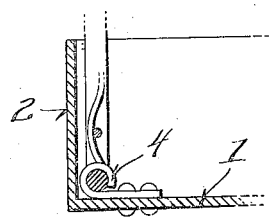
Witness:
R. E. Weber
Inventor:
Charles H. Hopf
By Young & Young
Attorneys

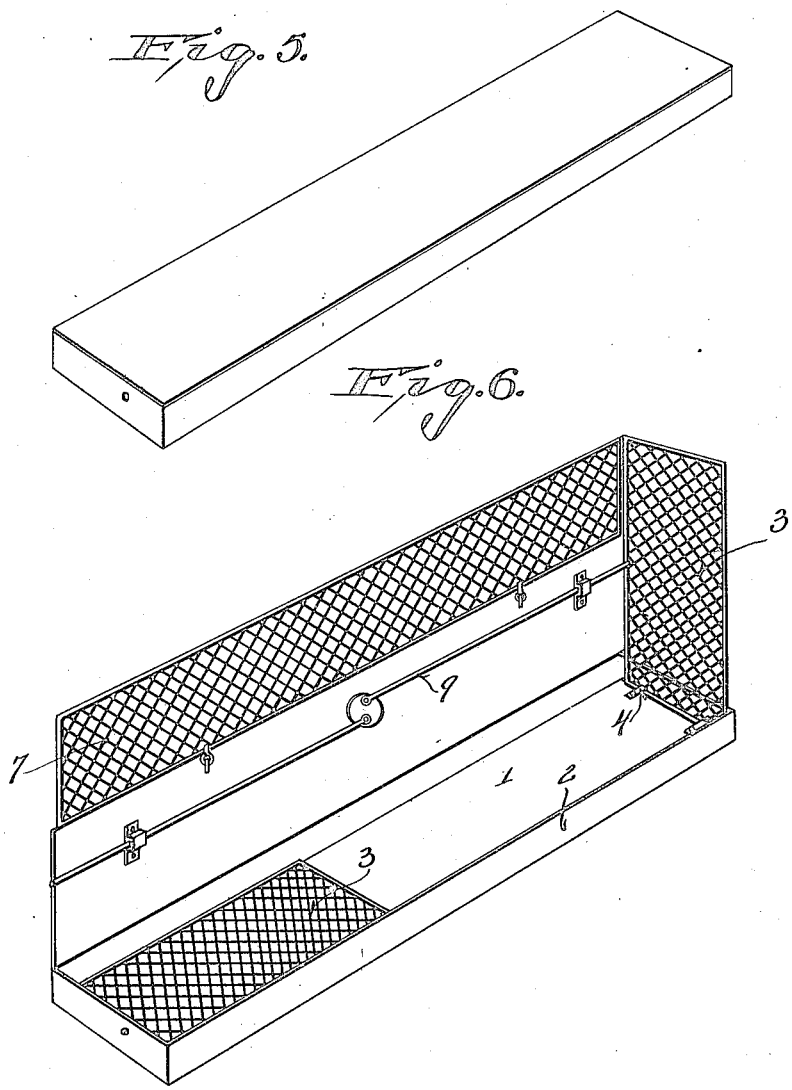

UNITED STATES PATENT OFFICE.

CHARLES H. HOPF, JR., OF MILWAUKEE, WISCONSIN.

COLLAPSIBLE LUGGAGE CARRIER.

1,426,644.  Specification of Letters Patent.  Patented Aug. 22, 1922.

Application filed November 22, 1920. Serial No. 425,721.

*To all whom it may concern:*

Be it known that I, CHARLES H. HOPF, Jr., a citizen of the United States, and resident of Milwaukee, in the county of Milwaukee and State of Wisconsin, have invented certain new and useful Improvements in Collapsible Luggage Carriers; and I do hereby declare that the following is a full, clear, and exact description thereof.

My invention relates to new and useful improvements in attachments for automobiles and similar vehicles, and pertains particularly to luggage carriers.

As at present constructed luggage carriers are usually unsightly objects on the side of an automobile, and when not in use serve no useful purpose whatsoever. Consequently it is the primary object of this invention to provide a simply constructed luggage carrier of good appearance, the parts of which are so arranged that they may be folded or collapsed when not in use.

A further important object of the invention is to provide a collapsible luggage carrier which is readily capable of being arranged for use in its normal position, but which when folded will occupy a relatively small space, and one wall thereof will form the foot board surface, or in other words the running board of the vehicle.

With these general objects in view, the invention resides in the novel features of construction, combination and arrangement of parts which will be hereinafter more particularly described and claimed.

In the accompanying drawings:

Figure 1 represents a side elevational view, of an automobile provided with one of my improved collapsible luggage carriers, the parts of which are in extended position.

Figure 2 is a transverse sectional view taken substantially on the plane of the line 2—2 of Figure 1.

Figure 3 is a detail horizontal section on the plane of the line 3—3 of Figure 1.

Figure 4 is a similar vertical sectional view on the plane of the line 4—4 of Figure 2.

Figure 5 is a perspective view of the luggage carrier in collapsed position and arranged to form a running board, and Figure 6 is a similar view of the parts of the carrier, with the exception of one end, in extended active position, said end being folded as it would be in Figure 5.

Referring more particularly to the drawings, it will be obvious that my invention may be applied as an addition to the running boards of motor vehicles, being mounted on the foot board surface thereof, or else it may be built into the frame of the vehicle and form the running board proper when in collapsed position. In either case the construction and operation are substantially identical.

For instance when the parts are collapsed they are housed within a substantially rectangular receptacle or receiving frame 1 having upright side and end walls 2 of such a height as to readily receive the collapsed parts. However, such height is not much greater than the usual thickness of an ordinary running board so that when my invention is built into the vehicle it is not particularly noticeable when collapsed. The receiving frame 1 being of a width substantially equal to the width of an ordinary running board, the end walls 3 of the carrier are relatively long and narrow, they being of such a width as to be readily receivable between the frame walls 2 as shown in Figures 2 and 6. It will also be noted from these figures that the end walls 2 are hinged at their lower ends as at 4 to the bottom of the receiving frame so that when collapsed they will lie substantially horizontal on the bottom of the frame 1.

The outer frame wall 2 has a carrier side wall 5 hinged thereto, this wall being formed in two parts, the lower portion 6 consisting of a solid flat plate and the upper portion 7 of any preferred construction such as a screen frame similar to the end walls 3. The two portions 6 and 7 are longitudinally hinged together as at 8 so that when they are collapsed, the upper portion will swing inwardly and lie against the inner surface of the lower portion 6.

When the carrier structure is no longer in use and is to be collapsed, the end frames 3 are first folded inwardly against the bottom of the receiving frame 1, after which the upper portion 7 of the wall 5 is folded downwardly against the lower portion 6, and then these two parts are folded inwardly over the end walls 3, said portion 7 resting on said walls 3 and the portion 6 lying on the upper edge of the frame walls 2, it overlapping the same to a certain extent to provide a watertight closure. Suitable locking and anti-rattling means such as is indicated as at 9 is provided for holding the parts of the carrier in collapsed position to allow the portion 6 of the wall 5 to be used as a foot board for the vehicle running board. Likewise any desired means, such as the clip 10, may be employed for securing the walls of the carrier in upright extended positions.

From the foregoing description taken in connection with the accompanying drawings it is obvious that various changes may be made in the form and proportions of the different parts of the invention, without departing from the principles thereof or sacrificing any of the advantages.

I claim:

1. In a luggage carrier, end walls adapted to be disposed substantially vertically in open position or folded substantially horizontally, a longitudinally hinged two-part side wall, the upper portion thereof being foldable against the lower portion, the two portions being foldable into substantially horizontal position over the horizontally disposed and folded end walls, said side and end walls terminating on the same horizontal plane, and means for holding the end walls and the two-parts of the side wall in vertical open position for the reception of luggage.

2. In a luggage carrier, a receiving frame, side and end flanges thereon, end walls hinged within said frame and said flanges and adapted to be disposed substantially vertically when in open position and braced against movement in one direction by said flanges and folded substantially horizontally against the bottom of said frame when in collapsed position and below the tops of said flanges, a side wall hinged to one of said side flanges adapted to be disposed substantially vertical when in open position and folded substantially horizontally over the end walls and engaged with the frame to provide a cover therefor, and means for holding the walls in substantially vertical open position.

In testimony that I claim the foregoing I have hereunto set my hand at Milwaukee, in the county of Milwaukee and State of Wisconsin.

CHARLES H. HOPF, Jr.